Figure 1:
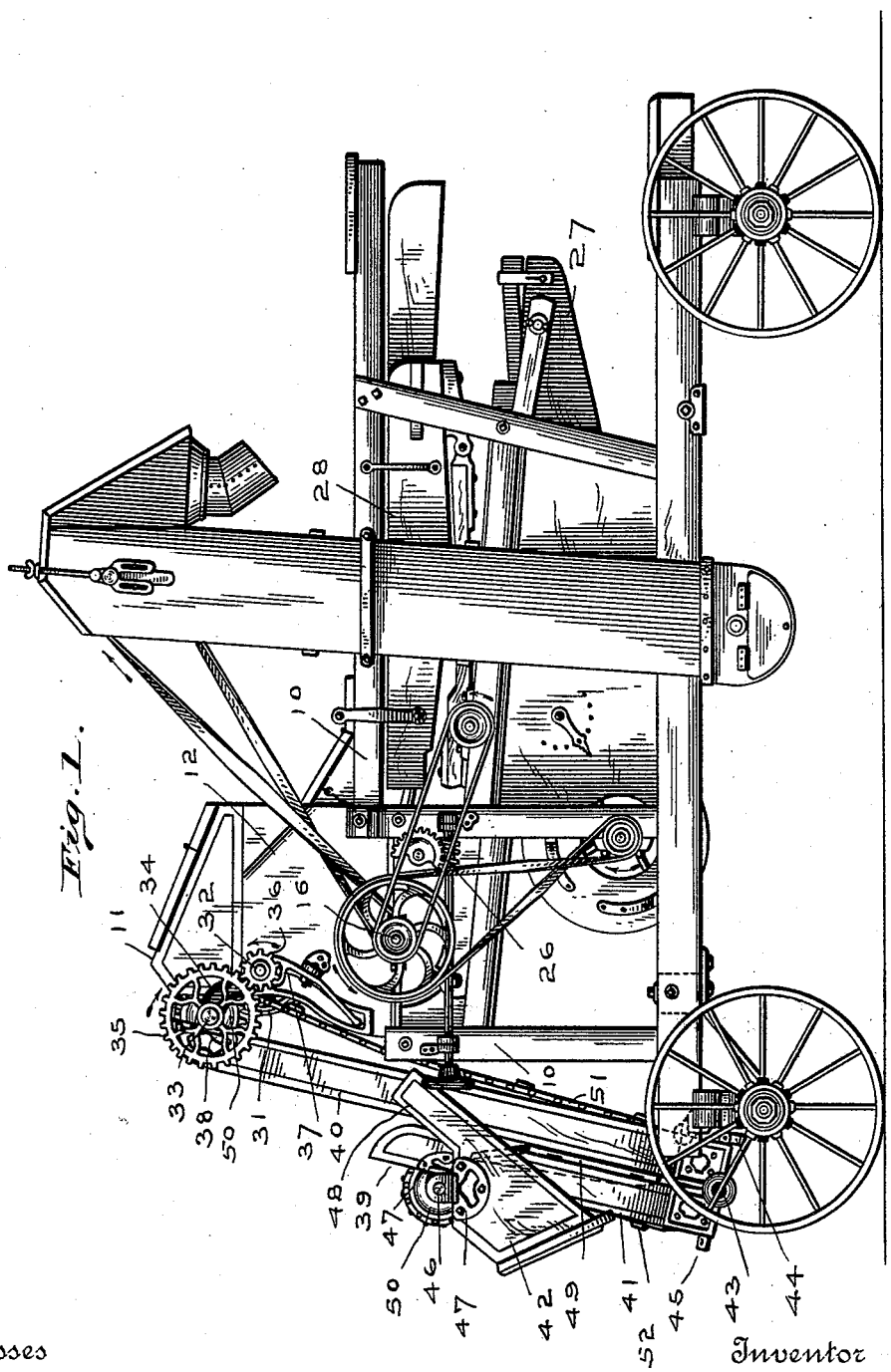

(No Model.) 3 Sheets—Sheet 1.

E. W. DOUGLAS.
CORN SHELLER.

No. 539,219. Patented May 14, 1895.

Witnesses
F. B. Nealy.
E. E. Vernell

Inventor
Elliott W. Douglas,
By Attorneys
Fowler & Fowler

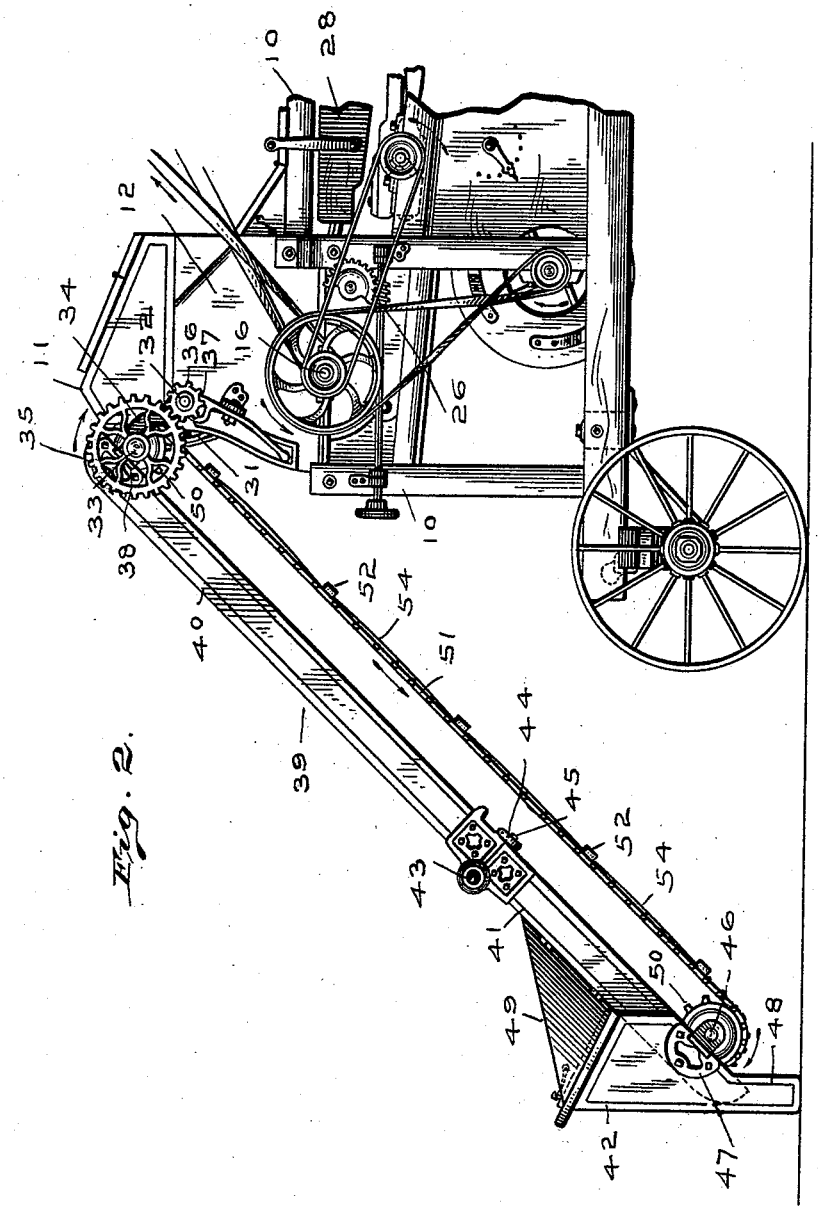

(No Model.) 3 Sheets—Sheet 3.
E. W. DOUGLAS.
CORN SHELLER.
No. 539,219. Patented May 14, 1895.
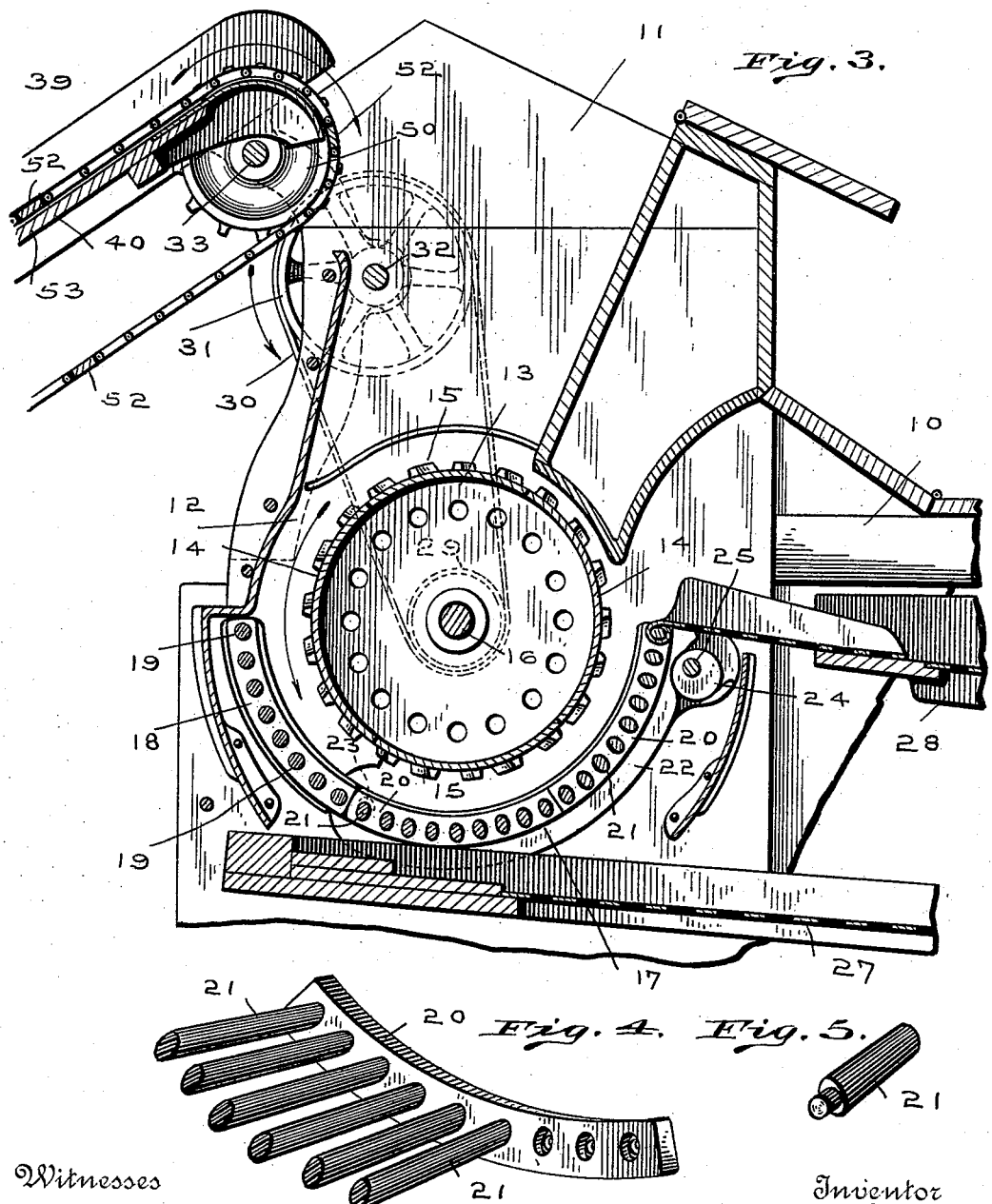
Witnesses
H. D. Nealy.
E. E. Vennell
Inventor
Elliott W. Douglas
By Attorneys
Fowler & Fowler

UNITED STATES PATENT OFFICE.

ELLIOTT W. DOUGLAS, OF ST. LOUIS, MISSOURI, ASSIGNOR TO THE KINGS-LAND & DOUGLAS MANUFACTURING COMPANY, OF SAME PLACE.

CORN-SHELLER.

SPECIFICATION forming part of Letters Patent No. 539,219, dated May 14, 1895.

Application filed August 16, 1894. Serial No. 520,437. (No model.)

*To all whom it may concern:*

Be it known that I, ELLIOTT W. DOUGLAS, a citizen of the United States, residing at St. Louis, in the State of Missouri, have invented certain new and useful Improvements in Corn-Shellers, of which the following is such a full, clear, and exact description as will enable any one skilled in the art to which it appertains to make and use the same, reference being had to the accompanying drawings, forming part of this specification.

My invention has for its object to provide a machine that will shell corn either in the shuck or after the shuck has been removed.

Another object is to shell or remove the corn cleanly from the cob and without damage to the grain.

A further object is to shell the corn from the cob without breaking or splitting the cobs, and also to shell the corn whether it is dry or wet.

In the drawings, where there is shown one form of corn-sheller connected with a separating-machine, Figure 1 is a side elevation of an entire shelling and separating machine, the feeder to the sheller being shown folded up. Fig. 2 is a side elevation of the end of the sheller which carries the feeder, such feeder being shown in a lowered or operative position. Fig. 3 is an enlarged longitudinal section through the hopper and cylinder-casing of the sheller, and also the adjacent parts of the machine. Fig. 4 is a detail perspective view of one of the segments, in which are secured the ends of the oval shelling-bars, a part of such bars being shown in place. Fig. 5 is a detail perspective view of one end of an oval shelling-bar.

Where all the bars of the concave are made round or all oval, the result and operation of the sheller are not satisfactory. When all round bars are used, it is well-nigh impossible to shell corn which is grown in northern countries, such corn being more firmly held to the cob. So too, when the corn is wet or shucked, round bars will not shell the corn satisfactorily. On the other hand where all oval bars are used in the concave, while the corn will be shelled from the cob, much of it will be injured in shelling and the cobs will be broken to pieces which is a serious objection in a sheller. Where part round and part oval bars are employed in the concave, the above objections are obviated, and northern and southern corn may be shelled equally well, whether wet or dry, shucked or unshucked, and the cob will be delivered from the sheller whole, and the shuck detached by the sheller from the cob.

The same marks of reference indicate the same parts throughout the several views of the drawings.

10 represents the framework of the sheller and separator, which may either be stationary or portable.

11 is a hopper whose throat opens into the cylinder shell or casing 12, this casing being secured to the framework 10, at one end of the machine, its under side and rear being open.

13 is the cylinder which is constructed in any desired way, the one shown in the drawings having metallic staves 14 with angular projections 15 thereon, the cylinder being mounted on and revolving with a shaft 16, which passes centrally through the cylinder casing and has suitable bearings outside thereof. The cylinder as shown in Fig. 3 revolves within a concave 17, which extends preferably about half around the circumference of the cylinder, and placed slightly eccentric thereto. The concave is formed of a number of pairs of segments, the first pair 18, being held rigidly in grooves or recesses cast in the sides of the cylinder casing, these fixed segments having round metallic bars 19, which extend across the cylinder casing and parallel to each other, the ends of the bars 19 being rigidly fixed in the segments 18. The other parts or segments 20 of the concave are similar to the first except that they are composed of bars 21, which are oval in cross section instead of round, and the bars are so placed in their segments 20 that the inner apex of each bar will point to the center or radial point of the segments.

The sections of the concave which carry the oval bars are not fixed in the cylinder casing but are secured in the concave holders 22, there being one of these on each side of the cylinder casing and on the inside thereof. The concave holders are pivoted at their lower or inner ends to the walls of the cylinder, as at 23.

The movable or pivoted sections of the concave are adjusted by means of eccentrics 24 keyed or fixed on a shaft 25, which extends through the cylinder casing, and out one side of the sheller where it is adjusted and held in place through a worm gear 26 on its end, which is operated by a convenient hand wheel, the eccentrics 24 bearing against the concave holders, so that by operating the worm gear 26, the concaves can be moved toward or from the cylinder.

A riddle or separator 27 is operated below the concave in any suitable manner, and receives all corn and husks that drop through the bars. An upper riddle or separator 28 is operated above the first one, its end extending to near the top or end of the adjustable sections of the concave, and all grain, cobs and husks which have passed entirely through the sheller are discharged upon the upper separator. After the corn, cobs, husks, &c., are discharged from the sheller, they are separated by the separators or riddles and each disposed of in any desired manner.

The cylinder shaft 16 has on one end a pulley 29, which is connected by a belt 30 to a pulley 31 mounted on the shaft 32, which passes entirely through the hopper 11. The shaft 33 has on the same end which carries the pulley 31, another similar pulley which is connected by a belt to any suitable source of power from which the sheller is to be driven. On the opposite end of the cylinder shaft 16 from which the pulley 29 is mounted, are keyed several pulleys connected by belts to the several operating parts of the separating machine, including the separators or riddles, the blow fan and the elevator.

33 is a transverse shaft carried in brackets 34 connected with the cylinder casing of the sheller. Mounted on one end of such shaft is a gear-wheel 35, which engages with a pinion 36 loosely mounted on the opposite end of the shaft 32 from the pulley 31, a clutch mechanism 37 of any suitable construction being connected with the pinion 36 for throwing such pinion in and out of operative connection with its shaft 32.

Loosely mounted on the shaft 33 and on the inside of the brackets 34 are brackets 38, which are rigidly secured to the side boards of the feeder 39. This feeder is preferably formed in three sections, 40, 41 and 42, so that when not in use, it may be folded up compactly on the end of the machine as shown in Fig. 1. The side boards of the sections 40 and 41 are hinged together at 43, and loops 44 are provided on the under side of one of the sections for looping over projecting lugs 45 on the other for locking the two together when opened out as shown in Fig. 2. The lower section 42 of the feeder is pivoted to the section 43 through the shaft 46, which has bearings in brackets 47 secured to each of these sections. The lower section 42 forms the end of the feeder and has feet or legs 48 which support it, and the folding sides 49 which are hinged to the section 41, when opened are secured by hooks 70 to the section 42 to hold the two sections firmly together and in place when so opened, as shown.

On the upper feeder shaft 33 above the sheller, and on the lower feeder shaft 46, are keyed or otherwise secured, sprocket-wheels 50, and connecting these wheels above and below are two parallel sprocket chains 51 carrying transverse slats 52 which run closely to the bottom 53 of the feeder, as shown in Fig. 3, or if desired a canvas web 54 is secured to the sprocket chains beneath the slats as shown in Figs. 1 and 2.

In operation a sheller embodying my invention would be brought to where the shelling was to be done and the feeder opened out so that its lower end would be convenient to the crib or pile, and the machine started. The ears of corn either shucked or unshucked would be then thrown promiscuously into the feeder and the action of the feed belt in drawing the requisite amount from under the heap and by the rolling motion acquired during the progress of the corn up the feeder to the cylinder hopper would bring each ear into a position parallel with the slats of the feeder, and therefore parallel with the cylinder and the bars of the concave. The ears would be thrown or dropped from the upper end of the feeder into the sheller still in this position. As the ears of corn entered the space between the cylinder and the first bars of the concave which are round bars, each ear would be permitted to make about one complete revolution between the round bars and the cylinder, which would remove a large part of the corn from the cob, and in unshucked corn also loosen the shuck. When the ears pass to the other sections of the concave which are provided with the oval bars, the effect of their sharper edges in connection with the action of the cylinder and the narrower space between such cylinder would remove all of the corn from the cobs, and in unshucked corn would detach the bulk of the shucks. Through the action of the feeder in bringing the ears of corn to the shelling cylinder in a position parallel with the cylinder and the bars of the concave, and the subsequent rolling motion imparted to the ears as they are passing between the round and oval bars of the concave and the cylinder, are accomplished the main points aimed at, viz: to shell the corn without damage; to shell it clean from the cob, whether shucked or unshucked, and last, but not least, to leave the cob whole and unbroken. These results are successfully attained whether the corn is wet or dry, and are impossible with round concave bars, or if the feed is not perfect.

To handle corn successfully under all conditions, particular attention must be given to it all along the line, from the time it is put into the feeder, to the time it leaves the sheller, and consideration of this is necessary to understand fully the difficulties that have been met and overcome. The feeder which contributes much to the perfect operation of the sheller, is constructed so that the proper amount of ear corn either shucked or unshucked will be fed regularly to the hopper of the sheller. The feeder being driven from the cylinder shaft through its gear and belt connections, allows the feeder to work perfectly at whatever angle it may be placed, and by its clutch mechanism may be thrown in and out of gear at any time. The ears of corn being fed into the sheller hopper always parallel with the cylinder and the concave bars, insures perfect shelling and prevents the cobs from being broken or split in passing through the sheller. They are, therefore, in the best and most valuable condition for fuel or manufacturing purposes. The greater part of the corn will be removed from the cobs by the round bars of the concave, but if all round bars were used, it would not be possible to thoroughly remove the corn when dry and shucked, and where it is unshucked and damp or wet, but a small per cent. could be shelled. Through the oval or sharper bars and by the contraction of the space between the concave bars and the cylinder, the corn will be entirely removed or shelled from the cobs and the work of the sheller will be as perfect with wet as with dry corn, either shucked or unshucked.

The adjustment of the oval bars allows ears of any size to be shelled clean in the machine, as the space between such bars and the cylinder can be regulated to the size of corn grown in any locality. Different cleaning or separating machines may be used in connection with the sheller and feeder herein described, without changing the effect of such sheller, the form of cleaner and separator shown being, however, a convenient and suitable one.

It is well known that corn can be broken from the stalk with much less labor than if the husk be removed at the same time, and the corn can be stored and cared for in the shuck much better and cheaper; also unshucked corn when shelled and prepared for market is in much finer condition than when the shuck is removed at first.

When the sheller is not in operation or is in transportation, the feeder is folded or closed up in the position shown in Fig. 1, without disconnecting or removing its driving connections or slatted feed belt, the loops 44 being first disengaged from the lugs 45. By lifting the lower section 42 of the feeder, the first section 40 can be swung inward so as to bear on the front part of the frame 1 of the sheller, thus taking the weight off of the shaft 33. By then unhooking the sides 49 and folding them in on the second section, swinging the lower section around and under the end of the second section 41 until the cross piece at the top of the lower section bears against the under side of the second section, such second section can be swung over to lie on the first section and the parts will be held up securely by their own weight, or if desired, a pin may be passed through the first and lower sections. When the feeder is to be again used, by merely opening the parts out and locking the same as shown in Fig. 2, the feeder and sheller are ready for work.

Taken as a whole the machine is simple in construction, perfect in operation, and its result will be the same in shelling corn either shucked or unshucked, wet or dry, and without damage to either the corn or the cob.

Having fully described my invention, what I claim as new, and desire to secure by Letters Patent, is—

1. In a corn sheller, the combination of a revoluble shelling cylinder, a concave composed of bars extending partly around the same, the first bars of such concave being round and fixed with relation to the cylinder, the others oval in cross section and adjustable with relation to said cylinder.

2. In a corn sheller, a folding feeder composed of sections hinged or pivoted together, the upper section hinged to the sheller and the lower forming a support for the feeder, a hopper formed partly on the two lower sections of such feeder, wings forming sides for the hopper and hinged to one of the lower sections of the feeder, and means for connecting such wings with the other section, whereby said wings and the several sections of the feeder are adapted to be folded up one on the other.

In testimony whereof I have hereunto set my hand and affixed my seal, this 10th day of May, 1894, in the presence of the two subscribing witnesses.

ELLIOTT W. DOUGLAS. [L. S.]

Witnesses:
 A. C. FOWLER,
 STANLEY STONER.